Patented Mar. 27, 1934

1,952,412

UNITED STATES PATENT OFFICE 1,952,412

RESINOUS COMPLEXES AND PROCESS OF PRODUCING SAME

Theodore F. Bradley, Westfield, N. J., assignor to Ellis-Foster Company, Montclair, N. J., a corporation of New Jersey No Drawing. Application May 7, 1928, Serial No. 275,963

18 Claims. (Cl. 260—8)

This invention relates to synthetic resinous complexes and to the process of making the same.

The object of this invention is to produce synthetically, certain resinous bodies, which while suitable for a wide variety of commercial usages, are particularly well suited for use in nitrocellulose lacquers.

It is observed that polybasic acids in general combine chemically with polyhydric alcohols merely by the action of time and of temperature. Many organic substances of these types yield resinous bodies at elevated temperatures, the exact nature of the substances so produced varying with the nature of the chemicals employed, the relative proportions of the reactants and with the time and temperature of the reaction. Products varying from viscous liquids to hard solids (often infusible) are obtained under carefully regulated conditions. Likewise the solubility is found to vary widely with the chemical composition and with the heat treatment.

This invention is not concerned with the production of the hard, tough, infusible and insoluble types of synthetic resinous bodies which may be made from glycerol and such polybasic acids as phthalic, succinic, camphoric, malic, maleic, citric, tartaric, diphenic, naphthalic, etc. Such resins may be of value for the production of molded products, but are unsuited for the purposes of this invention.

Resinous products suitable for use in nitrocellulose lacquers and in other coating compositions must be soluble in various volatile organic solvents. Solubility is therefore the primary consideration and while hard resins are often desired, I am able to utilize most products varying from liquid consistencies to hard solids as long as they remain soluble in those volatile organic solvents commonly employed in lacquers and varnishes.

An extended research has shown that the various polyhydric alcohols which may be used in the production of synthetic resinous bodies by reaction with polybasic acids are not equivalents except in the sense that they all react chemically with acids to form esters, a reaction common to all alcohols. The products produced from the various polyhydric alcohols vary considerably in their physical properties according to the particular type of polyhydric alcohol employed. In general, it is observed that the hardness of the resins so produced varies with the multiplicity of the hydroxyl groups in the polyhydric alcohol. Likewise, the tendency to form infusible condensation products is partly dependent upon this factor.

Polyhydric alcohols containing but two hydroxyl groups are observed to produce less hard, (often viscous liquid) products than those produced from the higher polyhydric alcohols such as glycerol, pentaerythritol, mannitol, etc. Moreover, such products show much less tendency to form infusible and insoluble condensation products and in fact, it is observed that in certain cases no infusible products are formed at all, which fact certainly indicates the great differences between the dihydric alcohols and those containing three or more hydroxyl groups. My general observations as disclosed herein have been more fully reported in my co-pending applications, Serial No. 193,743, filed May 23, 1927; Serial No. 244,781, filed January 5, 1928; and Serial No. 251,460, filed February 2, 1928, of which this application is in part a continuation.

In the present application it should suffice to state that it is observed that owing to the fact that the dihydric alcohols and substituted dihydric alcohols show much less tendency to form insoluble and infusible condensation products when heated with polybasic organic acids, than do the polyhydric alcohols of greater hydroxylation, these bodies are of particular value for the purposes of this invention. Among the dihydric alcohols and substituted dihydric alcohols which I may employ to advantage are the following: ethylene, propylene, butylene and amylene glycols, and the polymers thereof such as the polyglycols. Likewise, those substances produced by the chemical union of two or more molecules of the glycols with each other whereby dihydric alcohol ethers are formed are found to be of much value for the purposes of this invention. Among such bodies are diethylene glycol (dihydroxy ethyl ether), tri and tetra ethylene glycols, and the corresponding homologues of the higher glycols. Other valuable substances are obtained by etherifying one or more hydroxyl groups of the higher polyhydric alcohols leaving at least two free hydroxyl groups for esterification. Among such bodies are the mono ethyl, propyl, butyl and phenyl ethers of glycerol, the mono and di ethers of pentaerythritol and hydroxy ethers of mannitol, sugars, etc.

The presence of ether groups in the polyhydric alcohols with limitation of the hydroxyl groups confers added solubility and marked reduction in the ability to form insoluble or infusible condensation products when said substances are heated (to effect chemical combination) with the polybasic acids.

Many examples of such action have been given in the aforesaid co-pending patent application.

Having indicated the peculiar virtues of these bodies I will now set forth the present invention.

One class of polybasic acid-polyhydric alcohol resins is the phthalic glyceride resin. The ease with which this type of material undergoes condensation to form infusible and insoluble products is well known and this property has led to its application in molding work and electrical insulation. The fusible types of this resin have been found to be possessed of limited value owing to the dearth of good solvents for these products and their high acidity and lack of resistance to water.

It has been found possible to modify this resin by the use of various monobasic acids whereby products of greater solubility and of better water resistance are obtained. With the exception of the hydroxylated glyceride oils such as castor oil it is observed that the glycerides of the non hydroxylated fatty acids do not readily enter into chemical union with the phthalic glyceride complex. Thus on heating a mixture of phthalic anhydride, glycerol and a non hydroxylated glyceride oil such as linseed, tung, rape, perilla, cottonseed, soya bean, menhaden, whale, etc., it is observed that the oil merely floats as an upper layer over the remainder of the mixture and as the reaction progresses an infusible, insoluble phthalic glyceride polymer results; the oil remaining in a substantially uncombined state. In the case of tung oil mixtures the tung oil often polymerizes also to an insoluble product without, however, entering into combination with the phthalic glyceride complex. Many deviations in the relative proportions of glycerol and of phthalic anhydride from the theoretical equivalents have failed to secure combination between such resins and the fatty oils.

This invention then is concerned primarily with a method for causing these oils to enter into chemical union with phthalic glyceride or related substances whereby resinous bodies are produced possessed of greater water resistance and having a wider range of solubility than the unmodified polybasic acid—polyhydric alcohol resinous bodies.

In order to render the non-hydroxylated oils soluble and capable of entering into chemical union with phthalic glyceride resins, I first prepare a synthetic resinous flux containing said oils by reacting at high temperatures phthalic anhydride with dihydroxy alcoholic bodies and the aforesaid oils. Generally it is desirable to heat such mixtures at a temperature above the boiling point of glycerol, i. e., in the region of 300° C. although occasionally combination is effected at temperatures as low as 250° C.

For example, I have prepared suitable fluxes as follows:—

A—Diethylene glycol,
  106 parts by weight=1 molecule
Phthalic anhydride,
  148 parts by weight=1 molecule
Tung oil_____ 100 parts by weight This mixture was heated in a partially closed vessel equipped with a short air-cooled reflux condenser which freely permitted the escape of steam, but not of glycol. The temperature was gradually raised to 300° C., the oil entering into combination at between 250 and 260° C. The temperature was held at 300° C. for two hours, the batch then being cooled. The product or flux so obtained was an extremely viscous, amber colored liquid. The acid number was 28.3. It dissolved in "Cellosolve" ethylene glycol monoethyl ether and in numerous nitrocellulose solvent mixtures and was found to be an excellent plasticizing agent for nitrocellulose films.

B—Diethylene glycol,
  106 parts by weight=1 molecule
Phthalic anhydride,
  148 parts by weight=1 molecule
Tung oil_____254 parts by weight This mixture was reacted in the same manner as in Example A and yielded a viscous liquid of much the same nature.

The acid number was 24.2.

C—Diethylene glycol_____ 106 parts by weight
Phthalic anhydride____ 148 parts by weight
Bleached menhaden oil 1016 parts by weight This was also heated under like conditions to form a viscous liquid substance.

Still another flux was made as follows:

D—Ethylene glycol,
  62 parts by weight=1 molecule
Phthalic anhydride
  148 parts by weight=1 molecule
Linseed oil_____ 200 parts by weight This was heated in a partially closed vessel to 300° C., this temperature being maintained for one hour. On cooling a viscous liquid was obtained which was suitable as a plasticizing agent for nitrocellulose lacquers.

E—Diethylene glycol_____ 110 parts by weight
Phthalic anhydride____ 148 parts by weight
Cochin cocoanut oil___ 100 parts by weight This mixture was heated in a partially closed vessel, equipped with an air-cooled reflux condenser to permit the escape of steam, the temperature being carried to 260° C. which temperature was maintained for one hour. The resulting product was a pale straw-colored highly viscous liquid material ideally suited for use as a plasticizing material in nitrocellulose lacquers. Their use may be illustrated by the following examples:

F—Phthalic anhydride_____ 80 parts by weight
Glycerol_____ 40 parts by weight
Flux C_____ 60 parts by weight This mixture may be heated in a suitable vessel such as indicated in Example A, the temperature being carried from 290 to 300° C. and held at that point until homogenity is secured and a sample taken shows the desired hardness.

Under these conditions I have secured a pale amber, hard tough resin having an acid number of 44 and a melting or softening point of 68° C. as determined by the A. S. T. M. "ball and ring" softening point test. This product is soluble in a variety of nitrocellulose lacquer solvents and is excellently suited for use in such compositions as well as for other purposes. It may be used alone as a coating material, may be emulsified in water and is excellently adapted for grease and water-proofing paper, and other surfaces or articles of manufacture.

G—Phthalic anhydride_____ 80 parts by weight
Glycerol_____ 35 parts by weight
Flux B _____ 80 parts by weight This mixture was heated in the aforesaid manner, the temperature being carried only to 270° C. and was held at that temperature for but 15 minutes. On cooling a hard but tough and flexible, light amber colored resin was obtained. It dissolved in the mono ethyl ether of ethylene glycol and in other solvents and blended well with nitrocellulose.

Still another resin was made as follows:

H—Glycerol _____ 25 parts by weight
Phthalic anhydride _____ 40 parts by weight
Flux D _____ 50 parts by weight Heated together in a partially closed container the mixture became homogeneous at 240° C. The temperature, however, was carried to 290° C. and held at that point for one hour. A hard tough pale amber colored resin having an acid number of 27.1 resulted. It melted at 60° C. and dissolved freely in "Cellosolve" ethylene glycol mono-ethyl ether and in mixtures of toluol, butanol and butyl acetate and in various other lacquer solvents.

In the manufacture of this resin one may alternatively choose to first partially react the phthalic anhydride and the glycerol to form a fusible resin subsequently adding the flux. If such procedure is used one must be careful not to heat the phthalic glyceride product for too long or at temperatures much over 220° C. as an infusible product readily will form.

In some cases the phthalic anhydride and glycerol may first be reacted to form a fusible resin and this may then be reacted with the synthetic fluxes. I may use as additional modifying agents in the final stage of reaction various monobasic acids or acid materials such as benzoic, benzoyl or toluyl benzoic acids, salicylic, fatty acids, rosin, Congo, etc., all of which serve to retard the formation of infusible and insoluble condensation products.

Occasionally I may substitute for the phthalic acid or anhydride other polybasic acids such as diphenic, naphthalic, etc., although on account of its economy and utility under present conditions I prefer to use phthalic acid or anhydride as the polybasic acid constituent of these resinous complexes.

I am able to employ any of the usual fatty glycerine oils of either animal, vegetable or marine origin, and through the process herein disclosed can cause these oils to combine with certain polybasic acid-glyceride complexes to form new substances of greater utility.

In the second stage of this process I may replace the glycerol by other hydroxylated bodies which contain three or more hydroxyl groups to the molecule. Thus I may employ polyglycerols, pentaerythritol, mannitol, various sugars and the like in place of the glycerol.

What I claim is:—

1. The process of forming a synthetic resinous body which consists in first heating a glyceride of a nonhydroxylated fatty acid with a dihydric alcoholic compound and phthalic anhydride to form a synthetic flux, and then heating said flux with phthalic anhydride and glycerol until a homogeneous product is obtained.

2. The process of forming a synthetic resinous body which consists in first heating a glyceride of a nonhydroxylated fatty acid with a dihydric alcoholic compound and phthalic acid to form a synthetic flux and then heating said flux with phthalic acid and glycerol until a homogeneous product is obtained.

3. The process of forming a synthetic resinous body which consists in first heating a glyceride of a nonhydroxylated fatty acid with a dihydric alcoholic compound and phthalic anhydride to form a synthetic flux and then heating said flux with phthalic anhydride and a polyhydric alcohol whose molecule contains more than two hydroxyl groups.

4. The process of forming a synthetic resinous body which consists in first heating a glyceride of a nonhydroxylated fatty acid with a dihydric alcoholic compound and phthalic anhydride to form a synthetic flux and then heating said flux with phthalic anhydride and pentaerythritol.

5. The process of forming a synthetic resinous body which consists in first heating a vegetable oil, phthalic anhydride and a dihydric alcoholic compound to form a synthetic flux and then heating said flux with phthalic anhydride and glycerol until a homogeneous product is obtained.

6. The process of forming a synthetic resinous body which consists in first heating a fish oil with a dihydric alcoholic compound and phthalic anhydride to form a synthetic flux and then heating said flux with phthalic anhydride and glycerol until a homogeneous product is obtained.

7. The process of forming a synthetic resinous body, which consists in first heating tung oil with a dihydric alcoholic compound and phthalic anhydride to form a synthetic flux and then heating said flux with phthalic anhydride and glycerol until a homogeneous product is obtained.

8. The process of forming a synthetic resinous body, which consists in first heating menhaden oil with a dihydric alcoholic compound and phthalic anhydride to form a synthetic flux and then heating said flux with glycerol and an additional amount of phthalic anhydride until a homogeneous product is obtained.

9. The process of forming a synthetic resinous body, which consists in first heating cocoanut oil with a dihydric alcoholic compound and phthalic anhydride to form a synthetic flux and then heating said flux with glycerol and an additional amount of phthalic anhydride until a homogeneous product is obtained.

10. In the process of forming a synthetic resinous body, the step which comprises heating a glyceride of a non-hydroxylated fatty acid with a dihydric alcoholic compound and phthalic anhydride to form a synthetic flux.

11. In the process of forming a synthetic resinous body, the step which comprises heating a glyceride of a non-hydroxylated fatty acid with a polyhydric alcohol containing two free hydroxyl groups, and a polybasic organic carboxylic acid to form a synthetic flux.

12. In the process of forming a synthetic resinous body, the step which comprises forming a synthetic flux from a polyhydric alcohol derivative having more than two hydroxyl groups, all but two of such hydroxyl groups being etherified, and a glyceride of a non-hydroxylated fatty acid.

13. The process of preparing a synthetic resinous product which comprises heating a flux formed from a glyceride of a non-hydroxylated fatty acid and a dihydric alcoholic compound and phthalic anhydride with glycerol and phthalic anhydride until a homogeneous product is obtained.

14. A resinous body containing the reaction products of a flux of a glyceride of a non-hydroxylated fatty acid with a dihydric alcoholic compound and phthalic anhydride, with phthalic anhydride and glycerol.

15. A fusible soluble resinous body containing the reaction products of a flux of a glyceride of a non-hydroxylated fatty acid, a dihydric alcoholic compound, and an organic carboxylic acid, with a polybasic organic carboxylic acid and a polyhydric alcohol, having an acid number of 44 or less.

16. A synthetic flux of a glyceride of a non-hydroxylated fatty acid, a dihydric alcohol, and a polybasic organic acid.

17. A synthetic flux of a non-hydroxylated vegetable oil, a dihydric alcohol and phthalic anhydride.

18. A viscous liquid flux of a non-hydroxylated vegetable oil, a dihydric alcohol, and a polybasic organic carboxylic acid, said flux having an acid number of 28.3 or less.

THEODORE F. BRADLEY.